April 29, 1958     C. BREMER ET AL     2,832,815

STORAGE BATTERY HAVING REMOVABLE CELL STRUCTURE

Filed March 9, 1956     2 Sheets-Sheet 1

INVENTORS
CASEY BREMER,
EDWARD M. ROSENTHAL,
BY
McMorrow, Berman + Davidson
ATTORNEYS.

April 29, 1958 C. BREMER ET AL 2,832,815
STORAGE BATTERY HAVING REMOVABLE CELL STRUCTURE
Filed March 9, 1956 2 Sheets-Sheet 2
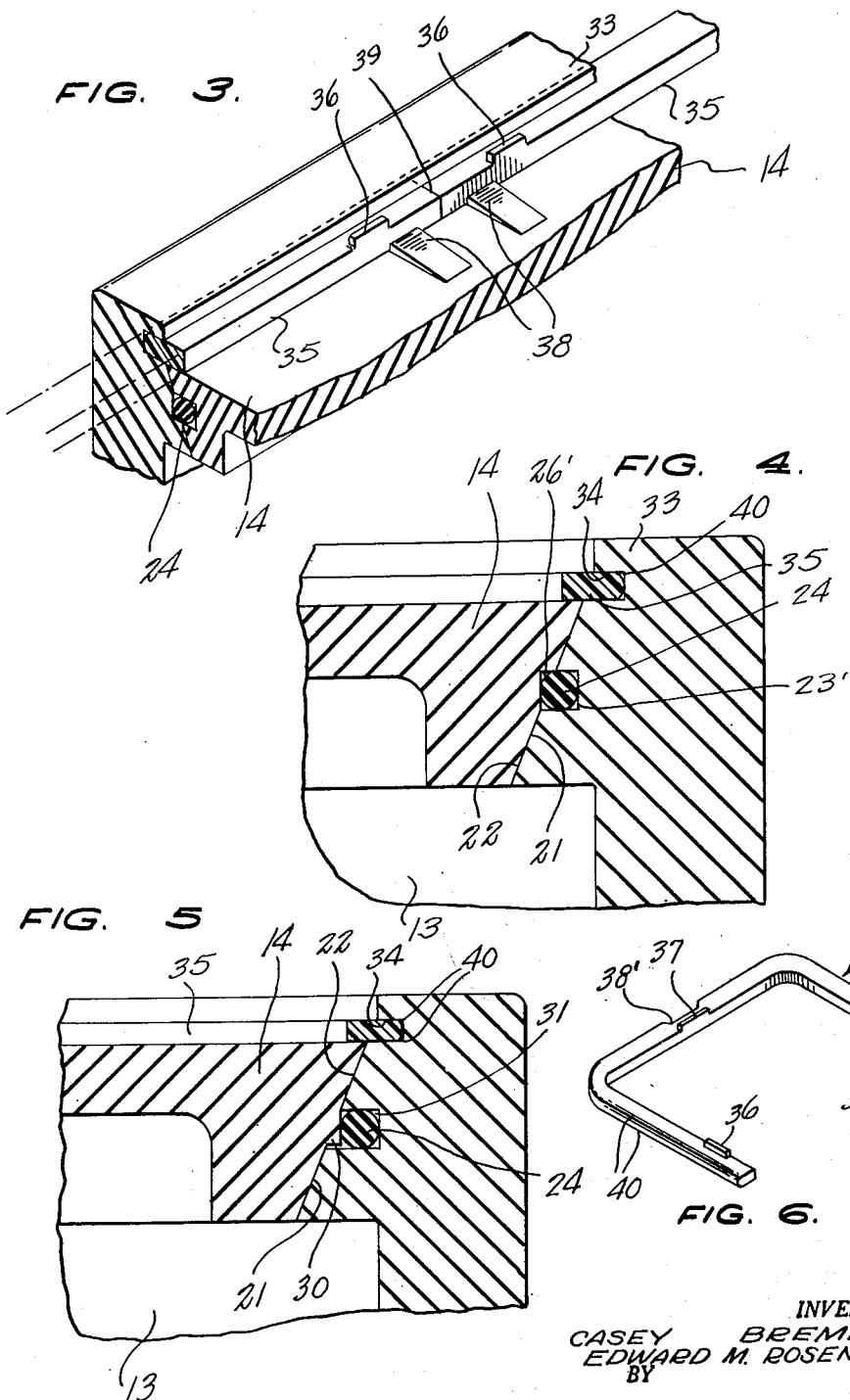
INVENTORS
CASEY BREMER,
EDWARD M. ROSENTHAL,
BY
McMorrow, Berman & Davidson
ATTORNEYS.

United States Patent Office 2,832,815
Patented Apr. 29, 1958

2,832,815

STORAGE BATTERY HAVING REMOVABLE CELL STRUCTURE

Casey Bremer, Mount Clemens, and Edward M. Rosenthal, Detroit, Mich.

Application March 9, 1956, Serial No. 570,464

5 Claims. (Cl. 136—170)

This invention relates to batteries, and more particularly to electric storage battery construction especially arranged to facilitate the removal, repair or replacement of the cell structure of the battery.

A main object of the invention is to provide a novel and improved electric storage battery which is arranged so that the cell structure thereof may be readily removed for repair or replacement, the battery being simple in construction, involving only a few special parts, and providing a great saving in time and labor in the servicing of the battery by making it a relatively simple task to remove or replace the cells thereof.

A further object of the invention is to provide an improved electric storage battery having means whereby the cell structure thereof may be readily removed and reinserted, the battery involving relatively inexpensive components, being easy to maintain in operating condition, and greatly reducing the cost involved in replacing the cells thereof or the elements of the cells when such replacement is necessary.

Further objects and advantages of the invention will become apparent from the following description and claims, and from the accompanying drawings, wherein:

Figure 3 is an enlarged fragmentary perspective view of a marginal portion of the battery cell shown in Figure 1 and illustrating the manner in which the locking strips are retained in the locking grooves around the margin of the cell cover;

Figure 4 is an enlarged transverse vertical cross sectional view taken through the top marginal portion of a modified form of storage battery according to the present invention;

Figure 5 is a vertical cross sectional view similar to Figure 4 but showing a still further modified form of storage battery according to this invention; and Figure 6 is a perspective view of one of the U-shaped resilient locking strips employed to retain the top cover of a battery cell in position, as employed in the battery of the present invention.

Figure 1:
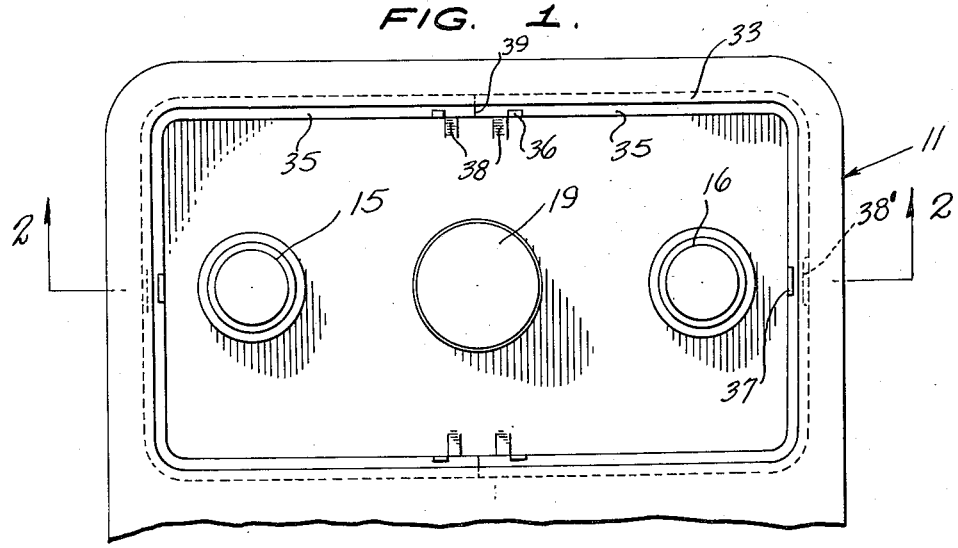
Figure 1 is a fragmentary top plan view of an electric storage battery constructed in accordance with the present invention.
Figure 2:
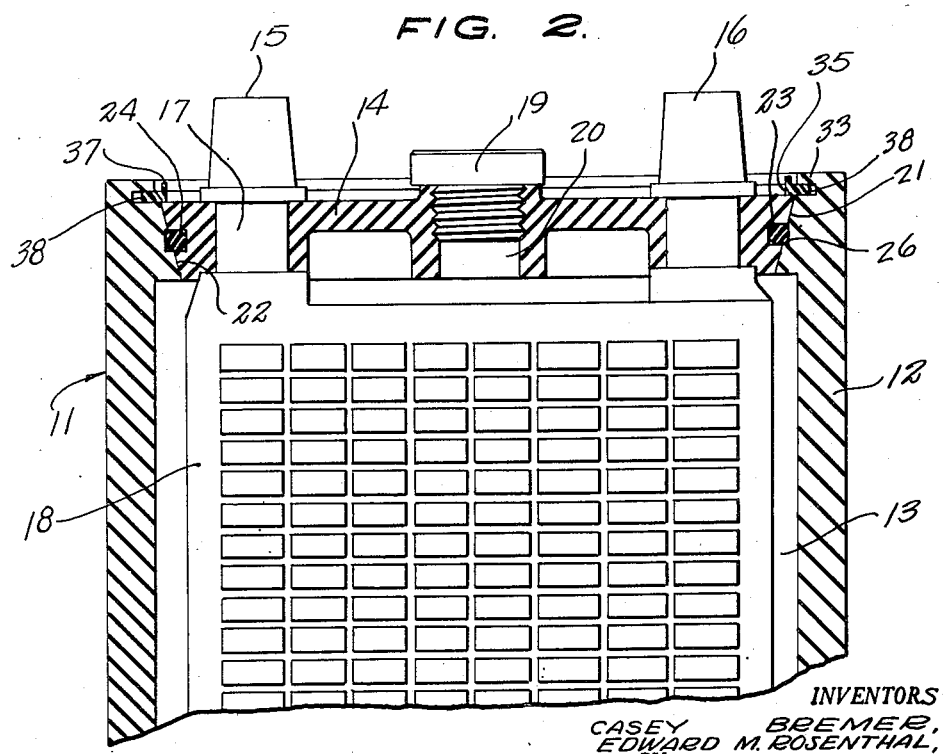
Figure 2 is a fragmentary vertical cross sectional view taken on line 2—2 of Figure 1.

Referring to the drawings, and more particularly to Figures 1, 2 and 3, 11 designates a storage battery of the type comprising a number of cells arranged in side by side relationship and being contained in a common case 12 of suitable insulating material. Thus, as shown in Figure 2, the case 12 is divided into a number of compartments, such as illustrated in Figure 2 at 13, each compartment containing one of the cells of the battery. Each compartment 13 is provided with a removable top cover 14 of suitable insulating material, the top cover carrying the cell terminals 15 and 16, each terminal comprising a post element 17 rigidly secured in the top cover 14 and supporting the associated grid element 18 therebeneath. Thus, each terminal 15 and 16 supports a grid member 18, said grid members being thus rigidly secured to the top cover 14 in parallel depending relationship with respect to said top cover.

As shown in Figure 2, a screw plug 19 is threadedly engaged in an aperture 20 provided in the top cover 14 between the cell terminals 15 and 16.

The top cover 14 is formed with the downwardly and inwardly sloping peripheral edge 21 which fits on the similarly sloping peripheral surface 22 of a generally rectangular top aperture provided in the case 12 over the cell compartment receiving the cover 14. The downwardly and inwardly sloping edge of the cover is formed with the peripheral groove 23 substantially at the intermediate portion of said edge, the groove 23 extending completely around the cover 14 and containing a sealing ring 24 of resilient deformable material. The downwardly and inwardly sloping surface 22 of the top aperture of the cell 13 is formed with a right angled groove 26 mating with the groove 23 to define a generally square passage in which the sealing ring 24 is sealingly and clampingly received so as to provide a liquid tight seal between the cover 14 and surface 22.

As shown in Figure 4, as an alternative, the right angled groove may be formed in the edge of the cover 14, as shown at 26' in Figure 4 and the mating groove, shown at 23' may be formed in the surface 22 of the cell aperture. Thus in the modification shown in Figure 4, the sealing ring 24 has its major portion received in the groove 23' but is clampingly and sealingly contained in the square passage defined by the mating grooves 26' and 23'.

A still further alternative construction is shown in Figure 5, wherein the downwardly and inwardly inclined edge surface of the cover 14 is formed at its intermediate portion with a right angled rib 30 and the wall of the cell aperture 22 is formed with a horizontal groove 31 of sufficient depth to substantially receive the entire cross section of the sealing ring 24 and also to receive the triangular rib 30 in its outer portion in clamping and sealing engagement against the sealing ring 24, as shown. Thus, when the rib 30 is engaged in the outer portion of the groove 31, a substantially square passage is defined in which the sealing ring 24 is clampingly and sealingly received. The top portion of the cell aperture comprises the peripheral wall element 33 which rises above the cell cover 14 and which is formed with an inwardly facing peripheral groove 34 shaped to receive a pair of substantially U-shaped, resilient retaining members 35, 35. The retaining members 35, 35 comprise respective U-shaped strips of suitable insulating material, such as plastic material, said strips being molded with respective upstanding lug elements 36, 36 at the inner margins of the end portions of their side arms, as shown in Figure 6, and being molded with an upstanding lug or rib 37 at the inside margin of its bight portion. Opposite the lug 37, the bight portion is reduced in width, as shown at 38', so that the bight portion is intentionally weakened at its midpoint, to facilitate the removal of the strips from the peripheral groove 34, when required.

The cover 14 is formed at the intermediate portion of each side margin thereof with a pair of upstanding lug elements 38, 38 spaced in the manner shown in Figures 1 and 3, and being arranged to engage the end portions of the arms of the strips 35, 35 at their inner surfaces so as to restrain the strip arms from disengaging from the locking groove 34.

The locking strips 35, 35 are of sufficient length so that when said strips are placed in the locking groove 34 in overlying relationship with the marginal portions of the cover member 14, as illustrated, the ends of the arms of the locking strips are substantially in abutting relationship, as shown at 39 in Figure 3.

As is clearly shown in Figure 3, the retaining lugs 38 have downwardly and inwardly inclined top surfaces, to facilitate the placement of the arms of the locking strips 35 in the locking groove 34, the arms of the locking strips being sufficiently flexible to allow said arms to be twisted slightly as the arms clear the top edges of the lugs 38 when being inserted in the groove 34. Insertion of the arms of the locking strips 35 is facilitated by grasping the upstanding lug elements 36, 36 which provide sufficient finger grip area to enable the operator to properly guide the locking strip arms into the locking groove 34.

Whenever it is necessary to remove the cover, the locking strips 35, 35 may be removed by inserting the end of a tool, such as a screw driver or the like, between the upper portion of the upstanding wall element 33 and the lug 37 and exerting inward force on the lug 37, whereby to fracture the bight portion of the locking strip at the weakened section 38' thereof. This allows the segments of the locking strips to be separately pulled out of the groove 34, and once one of the locking strips is removed, the opposite locking strip 35 may be readily removed from the groove 34.

As will be readily understood, the locking strips 35, 35 are intended to be disposable, and are therefore relatively inexpensive and are replaced by new locking strips when the cell is reassembled after the required repair operations have been performed thereon.

From the above description, it will be readily apparent that when battery servicing is required, each cell component, as well as the case, if necessary, can be readily replaced without damaging the other components.

Any desired cross sectional shape may be employed for the sealing ring 24. The ring may be circular in cross section, as shown, or alternatively, may be oval, square or rectangular with rounded corners.

The outer edges of the locking strips, namely, the edges which are inserted into the retaining slot 34 are preferably rounded off, as shown at 40, so that the locking strips will be receivable in the groove 34 even if there is a certain amount of residual foreign material in the groove.

While certain specific embodiments of an improved electric storage battery construction have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a storage battery, a case having a top aperture formed with a downwardly and inwardly sloping peripheral surface, a cover member having secured thereto a plurality of depending battery grid elements, said cover member having a peripheral edge sloping downwardly and inwardly and shaped to fit the peripheral surface of said top aperture, whereby to support said battery grid elements in said case when the cover member is engaged in said top aperture, said case being formed with a groove adjacent and extending completely around the periphery of said top aperture, a pair of generally U-shaped molded plastic locking strips disposed in said groove with their ends substantially in abutment, said strips extending entirely around and being of sufficient width to overlie the marginal portions of said cover member and to retain said cover member in said top aperture, the abutting ends of the strips limiting endwise movement of the strips, respective upstanding lug elements on said cover member adjacent the inner sides of the ends of said strips to prevent said ends from disengaging from said groove, said ends being sufficiently flexible to pass over said lug elements into said groove, and upstanding lugs on the inner edges of the bight portions of said locking strips, said bight portions being reduced in width opposite said last-named lugs to weaken said bight portions adjacent said last-named lugs, whereby to facilitate the removal of the locking strips when required.

2. In a storage battery, a case having a top aperture formed with a downwardly and inwardly sloping peripheral surface, a cover member having secured thereto a plurality of depending battery grid elements, said cover member having a peripheral edge sloping downwardly and inwardly and shaped to fit the peripheral surface of said top aperture, whereby to support said battery grid elements in said case when the cover member is engaged in said top aperture, said case being formed with a groove adjacent and extending entirely around the periphery of said top aperture, locking means disposed in said groove and overlying the marginal portions of said cover member, said locking means comprising a pair of generally U-shaped, molded plastic locking strips disposed in said groove with their ends substantially in abutment and extending entirely around and overlying the margins of said cover member, the abutting ends of the strips limiting endwise movement of the strips, and upstanding retaining means on the cover member engaging the inner sides of the arms of said locking strips, said arms being sufficiently flexible to pass over said retaining means into said groove.

3. In a storage battery, a case having a top aperture formed with a downwardly and inwardly sloping peripheral surface, a cover member having secured thereto a plurality of depending battery grid elements, said cover member having a peripheral edge sloping downwardly and inwardly and shaped to fit the peripheral surface of said top aperture, whereby to support said battery grid elements in said case when the cover member is engaged in said top aperture, said case being formed with a continuous groove adjacent and extending entirely around the periphery of said top aperture, and a pair of generally U-shaped, molded plastic locking strips disposed in said groove with their ends substantially in abutment, the abutting ends of the strips limiting endwise movement of the strips, said strips extending entirely around and being of sufficient width to overlie the marginal portions of said cover member and to retain said cover member in said top aperture.

4. In a storage battery, a case having a top aperture formed with a downwardly and inwardly sloping peripheral surface, a cover member having secured thereto a plurality of depending battery grid elements, said cover member having a peripheral edge sloping downwardly and inwardly and shaped to fit the peripheral surface of said top aperture, whereby to support said battery grid elements in said case when the cover member is engaged in said top aperture, said case being formed with a groove adjacent the periphery of said top aperture, a pair of generally U-shaped, molded plastic locking strips disposed in said groove with their ends substantially in abutment, the abutting ends of the strips limiting endwise movement of the strips, said strips extending entirely around and being of sufficient width to overlie the marginal portions of said cover member and to retain said cover member in said top aperture, and respective upstanding lug elements on said cover member adjacent the inner sides of the ends of said strips to prevent said ends from disengaging from said groove, said ends being sufficiently flexible to pass over said lug elements into said groove.

5. In a storage battery, a case having a top aperture formed with a downwardly and inwardly sloping peripheral surface, a cover member having secured thereto a plurality of depending battery grid elements, said cover member having a peripheral edge sloping downwardly and inwardly and shaped to fit the peripheral surface of said top aperture, whereby to support said battery grid elements in said case when the cover member is engaged in said top aperture, said case being formed with a groove adjacent the periphery of said top aperture, a pair of generally U-shaped, molded plastic locking strips disposed in said groove with their ends substantially in abutment, the abutting ends of the strips limiting endwise movement of the strips, said strips extending entirely around and being of sufficient width to overlie the marginal portions of said cover member and to retain said cover member in said top aperture, respective upstanding lug elements on said cover member adjacent the ends of said strips to prevent said ends from disengaging from said groove, said ends being sufficiently flexible to pass over said lug elements into said groove, and a sealing ring of deformable resilient material sealingly disposed between the peripheral edge of said cover member and the edge of said top aperture, below said locking strips.

References Cited in the file of this patent

UNITED STATES PATENTS

| | | |
|---|---|---|
| 986,449 | Ford | Mar. 14, 1911 |
| 1,269,096 | Land | June 11, 1918 |
| 2,186,147 | Pucher | Jan. 9, 1940 |
| 2,396,323 | Graf | Mar. 12, 1946 |
| 2,462,445 | Weiss | Feb. 22, 1949 |

FOREIGN PATENTS

| | | |
|---|---|---|
| 560,088 | France | Sept. 28, 1923 |
| 820,627 | France | Aug. 2, 1937 |